(No Model.)

T. L. DELPY.
FREEZER.

No. 390,349. Patented Oct. 2, 1888.

WITNESSES:
C. Neveux
C. Sedgwick

INVENTOR
T. L. Delpy
BY
Munn & Co.
ATTORNEY

UNITED STATES PATENT OFFICE.

THÉODORE LÉON DELPY, OF PARIS, FRANCE, ASSIGNOR TO LEON DERMIGNY, OF NEW YORK, N. Y.

FREEZER.

SPECIFICATION forming part of Letters Patent No. 390,349, dated October 2, 1888.

Application filed June 6, 1888. Serial No. 276,173. (No model.) Patented in France April 19, 1878, No. 124,195.

*To all whom it may concern:*

Be it known that I, THÉODORE LÉON DELPY, of Paris, France, have invented a new and Improved Freezer, (for which I obtained a patent in France April 19, 1878, No. 124,195,) of which the following is a full, clear, and exact description.

The object of the invention is to provide a new and improved freezer specially adapted for making ice in small quantities for household use.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1:
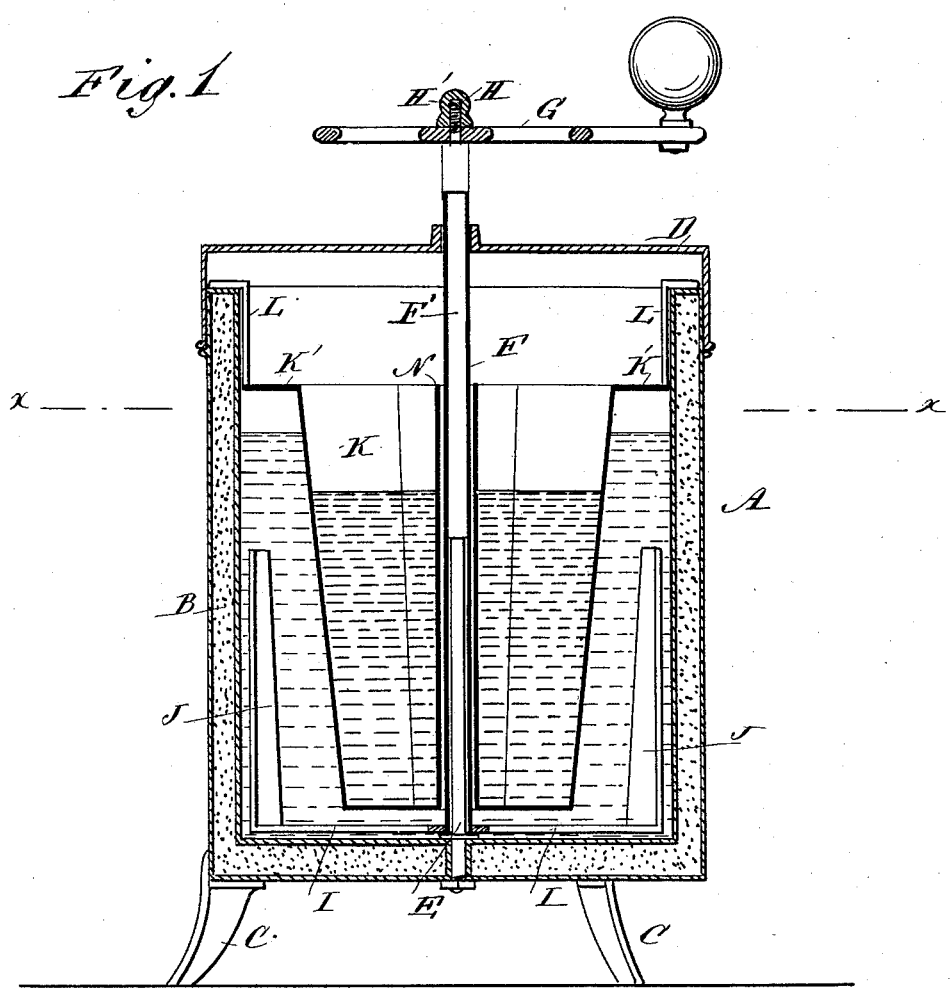
Figure 2:
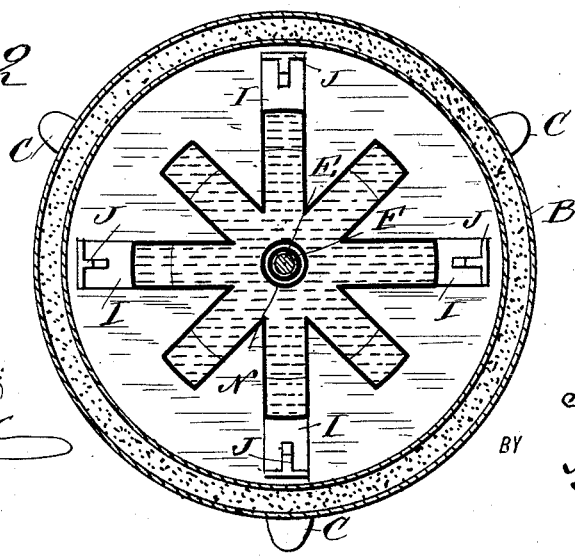

Figure 1 is a sectional elevation of the improvement, and Fig. 2 is a sectional plan view of the same on the line $x\ x$ of Fig. 1.

The improved freezer A is provided with a receptacle, B, having double walls filled in with a non-conducting material. The receptacle B is mounted on legs C, and is provided at its upper open end with a cover, D. On the bottom of the receptacle B and in its middle is secured an upwardly-projecting pin, E, on which fits a sleeve, F, secured to a shaft, F', resting at its lower end on the top of the pin E and passing with the sleeve F through a suitable bearing in the cover D.

On the outer end of the shaft F' is secured a hand-wheel, G, by means of a bolt, H, and nut H'. On the lower end of the sleeve F are secured the radial arms I, extending to within a short distance of the bottom of the receptacle B, and provided with upwardly-extending beaters J, T-shaped in cross-section, for stirring up the freezing liquid, as hereinafter more fully described.

In the receptacle B is held a vessel, K, preferably made star-shaped in cross-section, as shown in Fig. 2, and provided at its upper end with an annular flange, K', fitting into the receptacle B, and provided with L-shaped arms L, resting on the top edge of the receptacle B, so as to support the vessel K in the freezing liquid contained in the receptacle B.

In the middle of the vessel K is held a tube, N, through which passes the sleeve F, before mentioned, so that the latter can revolve without revolving the vessel K. In the latter is placed the water or other liquid to be frozen.

The operation is as follows: When the several parts are in the position shown in the drawings and the receptacle B contains the freezing mixture and the vessel K contains the water or other liquid to be frozen, the operator turns the hand-wheel G, so as to rotate the sleeve F, turning on the pin E as its bearing. The rotary motion of the sleeve F causes the beaters J to pass through the freezing mixture in the receptacle B, so that the mixture is agitated and exerts its freezing power on the vessel K containing the liquid to be frozen. Said liquid is consequently congealed and frozen in a very short time. When the desired result is obtained, the operator, after removing the handle from the shaft, removes the cover D, and then lifts the vessel K out of the receptacle B by moving said vessel over the sleeve F, the sleeve remaining on the pin E and the shaft F' within the sleeve.

Instead of freezing the liquid in the vessel K, I may place bottles of wine or other substances in the said liquid, so as to cool the contents of the bottles.

Having thus fully described my invention, I claim as new and desire to secure by Letters Patent—

1. In a freezer, the combination, with a receptacle and a pin held in the bottom of the said receptacle, of a sleeve fitting over the said pin and adapted to be rotated, beaters secured to the said sleeve and extending vertically in the said receptacle, a vessel containing the liquid to be frozen and supported in the said receptacle, and a tube held in the middle of the said vessel, through which said sleeve passes, substantially as shown and described.

2. In a freezer, a receptacle, a cover held on the said receptacle, and a pin secured in the bottom of the said receptacle, in combination with a sleeve held to turn on the said pin and passing through the said cover, horizontal arms extending from the lower end of the said sleeve, vertical beaters secured to the ends of the said arms, a vessel supported in the said receptacle, and a tube held in the center of the said vessel, and through which the said sleeve passes, substantially as shown and described.

3. In a freezer, the combination, with a receptacle having an upwardly-projecting pin in its bottom, and a sleeve fitting over the pin and provided with beaters at its lower end, of a vessel suspended in the receptacle and having a central opening, through which the tube passes, a shaft secured in the sleeve and resting on the pin in the receptacle, and a handle on the upper end of the said shaft, substantially as described.

THÉODORE LÉON DELPY.

Witnesses:
ROBT. M. HOOPER,
C. GAVOTY.